US012494910B2

(12) United States Patent
Vigilant et al.

(10) Patent No.: US 12,494,910 B2
(45) Date of Patent: Dec. 9, 2025

(54) METHOD SECURED AGAINST SIDE-CHANNEL ATTACKS PERFORMING A CRYPTOGRAPHIC ALGORITHM COMPRISING A POLYNOMIAL OPERATION

(71) Applicant: THALES DIS FRANCE SAS, Meudon (FR)

(72) Inventors: David Vigilant, Angers (FR); Mylène Rousselet, Saint Savournin (FR); Fabrice Perion, Paris (FR)

(73) Assignee: THALES DIS FRANCE SAS, Meudon (FR)

( * ) Notice: Subject to any disclaimer, the term of this patent is extended or adjusted under 35 U.S.C. 154(b) by 58 days.

(21) Appl. No.: 18/720,685

(22) PCT Filed: Dec. 15, 2022

(86) PCT No.: PCT/EP2022/086231
§ 371 (c)(1),
(2) Date: Jun. 17, 2024

(87) PCT Pub. No.: WO2023/111218
PCT Pub. Date: Jun. 22, 2023

(65) Prior Publication Data
US 2025/0055687 A1  Feb. 13, 2025

(30) Foreign Application Priority Data

Dec. 17, 2021 (EP) .................................... 21306829

(51) Int. Cl.
*H04L 29/06* (2006.01)
*H04L 9/30* (2006.01)
*H04L 9/40* (2022.01)

(52) U.S. Cl.
CPC ........ *H04L 9/3093* (2013.01); *H04L 63/1466* (2013.01)

(58) Field of Classification Search
None
See application file for complete search history.

(56) References Cited

U.S. PATENT DOCUMENTS 10,277,403 B2 * 4/2019 Hoffstein ............. H04L 9/3026
10,560,257 B2 * 2/2020 Hoffstein ............. H04L 9/0618
(Continued)

OTHER PUBLICATIONS

International Search Report (PCT/ISA/220) and Written Opinion (PCT/ISA/237) mailed on Mar. 2, 2023, by the European Patent Office as the International Searching Authority for current International Application No. PCT/EP2022/086231 [13 pages].

*Primary Examiner* — Jeffery L Williams

(57) ABSTRACT

Provided is a method to secure against side channel attacks performing a cryptographic operation of a cryptographic algorithm. It includes selecting a multiplier integer t and determining a second integer q' by multiplying said first integer q, determining (S2) an invertible random polynomial R[X] in said first polynomial ring $R_q$, randomizing (S3) the coefficients Ai of said input polynomial A[X] based on said determined second integer q' and said determined random polynomial R[X], performing (S4) the polynomial operation of the cryptographic operation on said randomized input polynomials A"[X], and unmasking (S5) the result polynomial Res"(X) by applying to its coefficients a modulo said first integer q operation. Other embodiments disclosed.

12 Claims, 3 Drawing Sheets

(56) References Cited

U.S. PATENT DOCUMENTS

| | | | |
|---|---|---|---|
| 10,673,610 B2* | 6/2020 | Vigilant | H04L 9/0631 |
| 12,321,472 B2* | 6/2025 | Fokle Kokou | G06F 21/78 |
| 2010/0077225 A1* | 3/2010 | Salgado | H04L 9/3249 |
| | | | 713/189 |
| 2013/0238904 A1* | 9/2013 | Salgado | G06F 11/1004 |
| | | | 726/22 |
| 2018/0123778 A1* | 5/2018 | Vigilant | H04L 9/004 |
| 2018/0212750 A1* | 7/2018 | Hoffstein | G06F 17/16 |
| 2019/0044719 A1* | 2/2019 | Poeppelmann | H04L 9/3093 |
| 2019/0044720 A1* | 2/2019 | Poeppelmann | H04L 9/0869 |
| 2020/0228309 A1* | 7/2020 | Hoffstein | G06F 17/16 |
| 2025/0055687 A1* | 2/2025 | Vigilant | H04L 9/3093 |

* cited by examiner

METHOD SECURED AGAINST SIDE-CHANNEL ATTACKS PERFORMING A CRYPTOGRAPHIC ALGORITHM COMPRISING A POLYNOMIAL OPERATION

FIELD

The present invention relates to the field of cryptographic methods and devices protected against side channel analysis and more particularly to protecting against side-channel attacks a cryptographic algorithm comprising a polynomial operation.

BACKGROUND

Cryptographic algorithms are commonly used for ensuring the privacy of communications by encryption, for authentication or for generating a verifiable signature. The increasing computational power of quantum computers is a growing threat to the security of classical signature schemes such as RSA or ECDSA. Such signature schemes will eventuality be completely defenseless against attacks performed using quantum computers. Therefore, work is being done to develop new efficient signature schemes that would be resistant against such attacks.

A class of encryption schemes able to resist quantum computers is lattice-based encryption and signature schemes. Such schemes are well positioned to be the next standard for post quantum cryptography. Nevertheless, such cryptographic algorithms are sensitive to side-channel attacks, based on an analysis of the power consumption or electromagnetic signature of the device performing the encryption.

A commonly used countermeasure against side-channel attacks is the masking of the intermediate values of an encryption process with a random mask. In that case, an attacker performing a side-channel attack at a given point of the encryption process would only get random values and would not obtain any information on the secret key used for the cryptographic process.

Lattice-based cryptography involves polynomial operations including both polynomial multiplications and additions. In order to protect lattice-based cryptographic operations against side-channel analysis, it is desirable to protect coefficients of polynomials used in polynomial operations of lattice based cryptographic schemes, in a way that enables to perform both polynomial additions and multiplications on masked polynomials without requiring an unmasking of the polynomial coefficients before performing the operation.

As a result, there is a need for a masking scheme applicable to polynomial coefficients in order to protect it against side-channel analysis, and compatible with both polynomial additions and multiplications.

SUMMARY OF THE INVENTION

For this purpose and according to a first aspect, this invention therefore relates to a method secured against side channel attacks performing a cryptographic operation of a cryptographic algorithm,
said cryptographic operation comprising at least one polynomial operation on at least one input polynomial A[X] in a first polynomial ring $R_q = F_q[X]/(X^n+1)$, with n an integer and q a first integer being a prime number,
wherein said method is performed by a cryptographic device comprising a processing system having at least one hardware processor and comprises:

selecting a multiplier integer t and determining a second integer q' by multiplying said first integer q by said selected multiplier integer t,
for each input polynomial A[X] with coefficients Ai in $F_q$ with i in [0, ... ,n−1],
determining an invertible random polynomial R[X] in said first polynomial ring $R_q$,
randomizing the coefficients Ai of said input polynomial A[X] based on said determined second integer q' and said determined random polynomial R[X] by:
transforming the input polynomial A[X] into a lifted input polynomial A'[X] with coefficients A' by lifting coefficients Ai of said input polynomial A[X] from a representation modulo said first integer q to a representation modulo said second integer q' such that Ai'=Ai+q mod q', with i in [0, ... ,n−1], the lifted input polynomial A'[X] being a polynomial in a second polynomial ring $R_{q'}' = F_{q'}[X]/(X^n+1)$,
randomizing the lifted input polynomial A'[X] by multiplying it by the random polynomial R[X] modulo said second integer q' to obtain a randomized input polynomial A"[X] in said second polynomial ring $R_{q'}'$,
performing said at least one polynomial operation of the cryptographic operation on said randomized input polynomials A"[X] instead of said input polynomials A[X] to obtain a result polynomial Res" [X] with coefficients $Res_i$ in $F_{q'}$,
unmasking said result polynomial Res"(X) by applying to its coefficients a modulo said first integer q operation and/or by multiplying it by inverses of said random polynomials R[X] determined for the input polynomials to provide a result of the cryptographic operation.

By doing so, the coefficients of the polynomials handheld during the polynomial operation may remain masked for both additions and multiplications without requiring any unmasking or change of mask before performing the operation.

The cryptographic algorithm may be a lattice-based algorithm.

In an embodiment, several second integers q' are precomputed and the step of determining a second integer q' comprises choosing randomly one integer among said precomputed second integer values q'.

It may be used to speed up the first step of the method.

The value of the multiplier integer t may be selected such that the value of the second integer q' corresponds to a width of the processor.

In an embodiment, said random polynomial R(X) determined for an input polynomial A[X] has degree zero and is a nonzero random integer $r_A$.

In this embodiment, in a first example wherein the polynomial operation comprises a multiplication between a first input polynomial A[X] and a second input polynomial B[X] in the first polynomial ring $R_q$,
the step of determining a random polynomial for each input polynomial may comprise determining a first random integer $r_A$ for the first input polynomial A[X] and a second random integer $r_B$ for the second input polynomial B[X],
the step of randomizing the coefficients of each input polynomial may comprise obtaining a randomized first input polynomial A"[X] from said first input polynomial A[X] and a randomized second input polynomial B" [X] from said second input polynomial B[X], the step of performing the at least one polynomial operation of the cryptographic operation may comprise performing a multiplication between the randomized first input polynomial A"[X] and the randomized second input polynomial B" [X] to obtain a randomized product polynomial P" [X] with coefficients Pi", and the step of unmasking the result polynomial Res"(X) may comprise computing product coefficients Pi=1/$r_A r_B$×Pi" modulo the first integer q to provide a result of the cryptographic operation based on said product coefficients Pi.

In this embodiment, in a second example wherein the polynomial operation comprises an addition between a first input polynomial A[X] and a second input polynomial B[X]in the first polynomial ring $R_q$, the step of determining a random polynomial for each input polynomial may comprise determining a single random integer r for both the first input polynomial A[X] and the second input polynomial B[X], the step of randomizing the coefficients of each input polynomial may comprise obtaining a randomized first input polynomial A"[X] from said first input polynomial A[X] and a randomized second input polynomial B" [X] from said second input polynomial B[X], the step of performing the at least one polynomial operation of the cryptographic operation may comprise performing an addition between the randomized first input polynomial A"[X] and the randomized second input polynomial B" [X] to obtain a randomized sum polynomial S"(X) with coefficients $S_i$", the step of unmasking the result polynomial Res"(X) may comprise computing sum coefficients Si=1/r×Si" modulo the first integer q to provide a result of the cryptographic operation based on said sum coefficients Si.

The values of $1/r_A r_B$ and of 1/r may be precomputed. It may be used to speed up the last step of the method.

The cryptographic algorithm may be among a signature generation, encapsulation, decapsulation, public key encryption or decryption, password-based key exchange algorithm.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a non-transitory computer readable medium storing executable computer code that when executed by a cryptographic device comprising a processing system having at least one hardware processor performs the method according to the first aspect.

According to a fourth aspect, this invention therefore relates also to a cryptographic device comprising:
a processing system having at least one hardware processor configured to perform the method according to the first aspect,
at least one memory for storing the input polynomial coefficients and the results of the calculations performed during the different computing steps.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

The invention aims at providing a method performing a polynomial operation of a cryptographic algorithm, in a way that is secured against side channel attacks. Such a cryptographic algorithm may for example be a signature generation, encapsulation, decapsulation, public key encryption or decryption, optionally homomorphic, password-based key exchange algorithm. This cryptographic algorithm may be a lattice-based cryptographic scheme such as Kyber or Dilithium, manipulating polynomials in a first polynomial ring $R_q = F_q[X]/(X^n+1)$, with n an integer. Such polynomials are of degree n−1 with coefficents in the range [0,q[ where q is a first integer which is a prime number.

Figure 1:
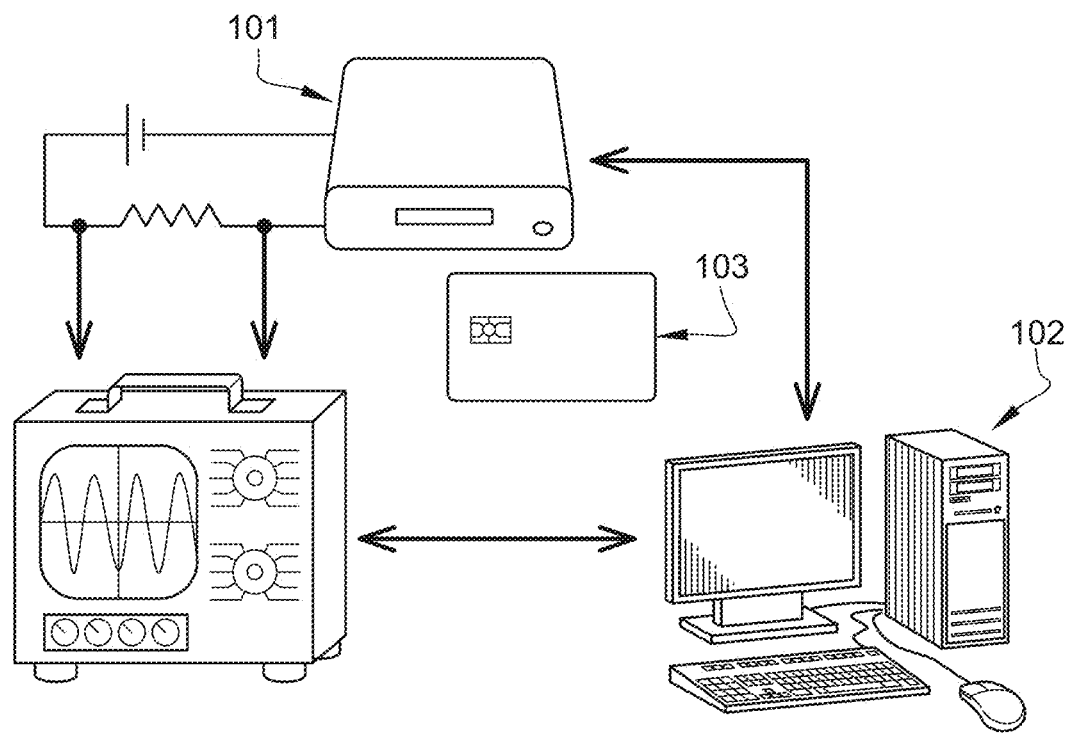
FIG. 1 is a schematic illustration of a system according to an embodiment of the present invention.

As depicted on FIG. 1, this method, and possibly the other steps of the cryptographic algorithm, is performed by a cryptographic device 101. Such a cryptographic device 101 may be connected to a personal computer or server 102 operated by a user and sending commands to the cryptographic device for cryptographic operations such as data encryption or decryption. Alternatively, the cryptographic device 101 may be embedded in the computer 102.

The cryptographic device 101 may include or be a tamper resistant device 103 secured against any unauthorized access including a processing system having at least one hardware processor for performing cryptographic operations, and at least one memory configured for storing the data needed for such operations, such as the coefficients of the polynomials used as input to the polynomial operations, intermediate results, mask values . . . Such a cryptographic device may for example be a smartcard reader housing a smartcard device, or an electronic device, such as a smartphone, including an integrated or embedded secure element.

Figure 2:
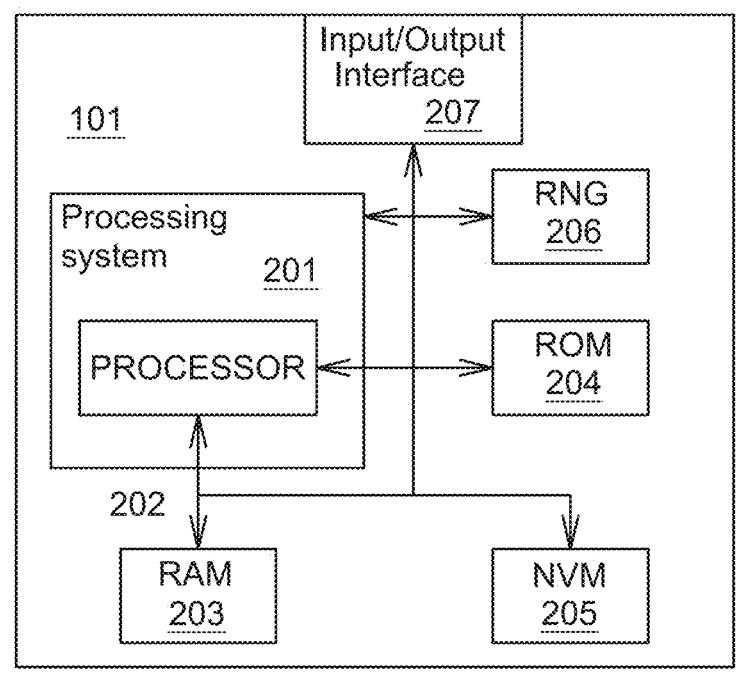
FIG. 2 is a schematic illustration of a cryptographic device according to an embodiment of the present invention.

As depicted on FIG. 2, the cryptographic device 101 may include a processing system 201 having at least one hardware processor, connected via a bus 202 to a computer readable memory circuit including a random access memory (RAM) 203, a read-only memory (ROM) 204, and/or a non-volatile memory (NVM) 205. The cryptographic device 101 may also include a random number generator (RNG) 206, included in the hardware processor or connected to it via the bus. The cryptographic device 101 may further include an interface 207 used to connect the cryptographic device 101 to the computer 102. Such an interface may be either a wired interface such as a USB, Ethernet or Thunderbolt interface, or a wireless interface, such as a Bluetooth interface. The interface 207 may also be a communication interface used to connect the cryptographic device 101 to a wireless network, e.g., wide-area networks, WiFi networks, or mobile telephony networks, or to a wired interface such as an Ethernet one, through which communication may be performed with the computer 102.

The main idea of the invention in order to randomize the coefficients of such polynomials in a way that remains compatible with both polynomial additions and multiplications is to apply to such polynomials two randomization operations
- first an additive masking operation by adding to each coefficient of the polynomial the prime number q. In order to effectively change the coefficients, they are lifted to a representation modulo q' instead of modulo q, with q' a multiple of q;
- then a multiplicative masking operation by multiplying the polynomial by a random polynomial.

By doing so, the additive masking can be removed easily by a simple "modulo q" operation. Therefore, polynomial additions and multiplications can be performed using randomized polynomials sharing the same masking (same q) without prior derandomization and the masking can be removed after addition or multiplication has been performed, in order to retrieve an unrandomized result.

Figure 3:
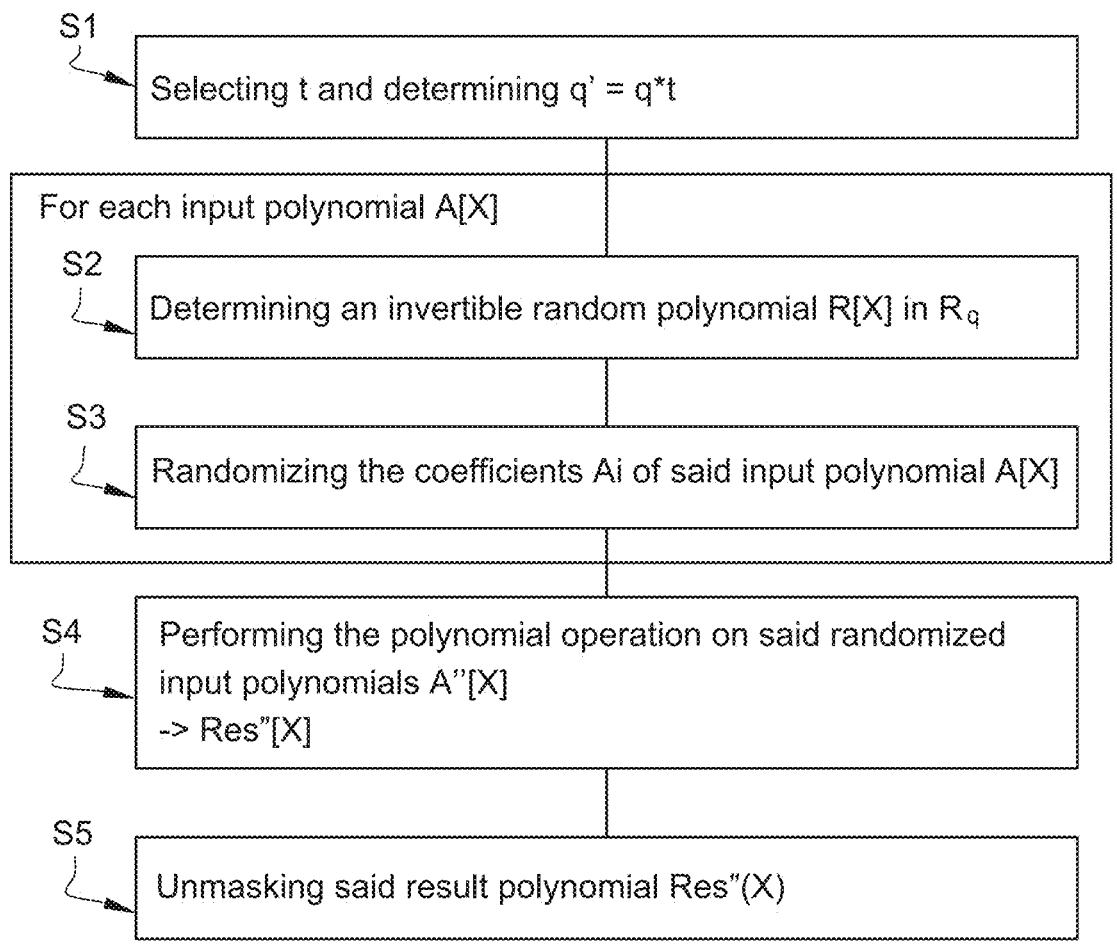
FIG. 3 illustrates schematically a method according to an embodiment of the present invention.

The following paragraphs describe, as depicted on FIG. 3, the steps of a method secured against side channel attacks and performing a cryptographic operation comprising at least one polynomial operation on at least one input polynomial A[X] in the first polynomial ring $R_q$.

In a first step S1, the processing system selects a multiplier integer t and determines a second integer q' by multiplying the first integer q by the selected multiplier integer t, such that q'=q*t.

In an embodiment, the value of the multiplier integer t is selected such that the value of the second integer q' corresponds to a width of the processor in order to keep modulo q' operations single precision operations. Alternatively t may be chosen such that q' is above a predetermined minimal value corresponding to a specific security level. Alternatively t may be a power of 2 in order to optimize the speed of modular operations modulo q'.

In another embodiment, several second integers q' may be precomputed and stored in a memory of the processing system. In such a case, determining a second integer q' comprises choosing randomly one integer among the precomputed second integer values q'.

In a second step S2, the processing system determines for each input polynomial A[X] an invertible random polynomial R[X] in the first polynomial ring $R_q$.

In an embodiment, such a random polynomial R[X] has degree zero and is a nonzero random integer $r_A$.

Figure 4:
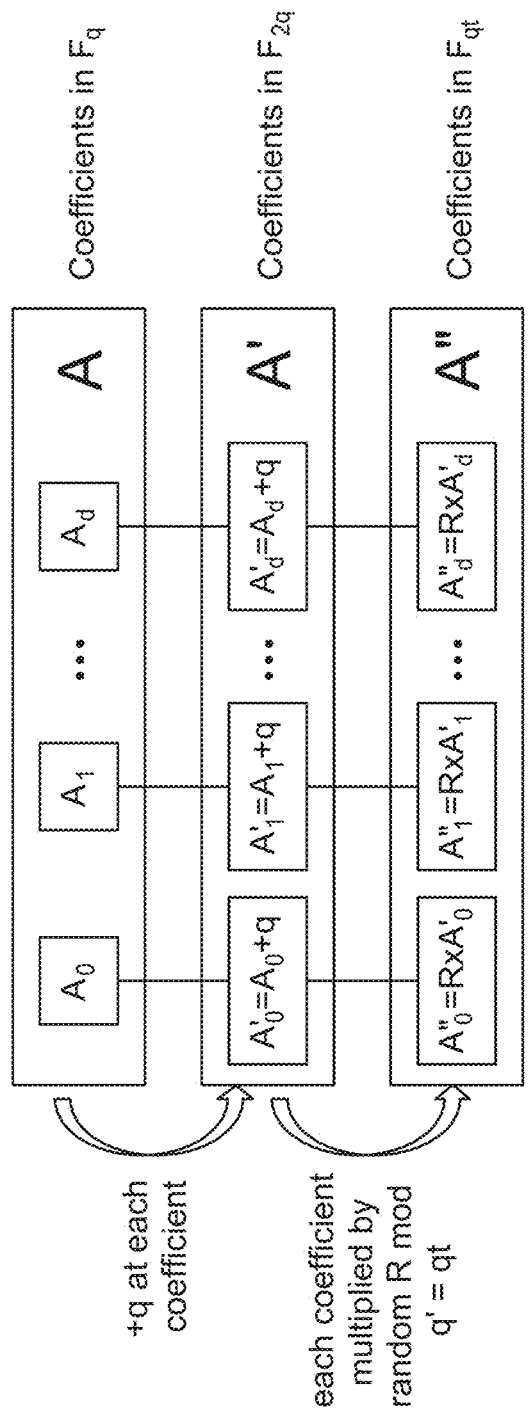
FIG. 4 illustrates schematically a polynomial randomization according to an embodiment of the present invention.

In a third step S3, as shown on FIG. 4, the processing system randomizes the coefficients Ai in $F_q$ with i in [0, . . . ,n−1] of each input polynomial A[X] based on the integer q' determined at the first step S1 and the random polynomial R[X] determined for this input polynomial at the second step S2 by:
- transforming the input polynomial A[X] into a lifted input polynomial A'[X] with coefficients Ai' by lifting the coefficients Ai of the input polynomial A[X] from a representation modulo said first integer q to a representation modulo said second integer q' such that Ai'=Ai+q mod q', with i in [0, . . . ,n−1]. By doing so, the lifted input polynomial A'[X] is a polynomial in a second polynomial ring $R_{q'}=F_{q'}[X]/(Xn+1)$,
- randomizing the lifted input polynomial A'[X] by multiplying it by the random polynomial R[X] modulo the second integer q' to obtain a randomized input polynomial A"[X] in the second polynomial ring Rq'.

In a fourth step S4, the processing system performs the at least one polynomial operation of the cryptographic operation on the randomized input polynomials A"[X] instead of the input polynomials A[X] to obtain a result polynomial Res" [X] with coefficients $Res_i$ in $F_{q'}$.

For example, such an operation may be a sum, a subtraction, a multiplication or the computation of the GCD (Greatest Common Divisor) of two randomized polynomials A"[X] and B" [X] obtained by randomizing at the third step S3 two first polynomials A[X] and B[X].

In a fifth step S5, the processing system unmasks, at least partially, the result polynomial Res" [X].

Depending on the next operations, such an unmasking may comprise one operation or a combination of two operations among:
- applying to its coefficients a modulo the first integer q operation: it would remove the additive masking of the coefficients;
- multiplying the result polynomial Res" [X] by inverses of the random polynomials determined for the input polynomials of the operation. It would remove the multiplicative masking of the coefficients of the result polynomial Res" [X]:
  - when the polynomial operation performed at the fourth step S4 is a polynomial multiplication. Indeed A"[X]*B" [X]=$R_A$[X]*$R_B$[X]*(A'[X]*B'[X]). In such a case the unmasking may comprise computing Res" [X]*($R_A$[X])$^{-1}$*($R_B$[X])$^{-1}$.
  - when the polynomial operation performed at the fourth step S4 is a polynomial addition and all input polynomials share the same random polynomial R[X]. Indeed A"[X]+B" [X]=R[X]*(A'[X]+B'[X]). In such a case the unmasking may comprise computing Res" [X]*(R[X])$^{-1}$.

If only the modulo q operation is applied, the multiplicative masking will remain. If only the multiplication by inverses of the random polynomials is applied, the additive masking will remain. If both are performed, the result is fully de-randomized.

A first example is given where the at least one polynomial operation comprises a multiplication between a first input polynomial A[X] and a second input polynomial B[X] in the first polynomial ring $R_q$, and where the random polynomials are integers.

In such a case, at the second step S2, determining a random polynomial for each input polynomial may comprise determining a first random integer $r_A$ for the first input polynomial A[X] and a second random integer $r_B$ for the second input polynomial B[X].

At the third step S3, randomizing the coefficients of each input polynomial may comprise obtaining a randomized first input polynomial A"[X] with coefficients Ai" from said first input polynomial A[X] and a randomized second input polynomial B" [X] with coefficients Bi" from said second input polynomial B[X], such that Ai"=$r_A$*(Ai+q) mod q' and Bi"=$r_B$*(Bi+q) mod q'.

At the fourth step S4, performing the at least one polynomial operation of the cryptographic operation may comprise performing a multiplication between the randomized first input polynomial A"[X] and the randomized second input polynomial B" [X] to obtain a randomized product polynomial P" [X] with coefficients Pi", such that P" [X]=A" [X]*B" [X]

At the fifth step S5, unmasking the result polynomial Res"(X) may comprise computing product coefficients Pi=1/$r_A r_B$×Pi" modulo the first integer q to provide a result of the cryptographic operation based on said product coefficients Pi.

By doing so, the result of the polynomial multiplication can be retrieved in an unmasked form at the fifth step by performing a simple division and a modulo, without removing the additive masking of the input polynomials before performing the multiplication.

A second example is given where the at least one polynomial operation comprises an addition between a first input polynomial A[X] and a second input polynomial B[X] in the first polynomial ring $R_q$ and where the random polynomials are integers.

In such a case, at the second step S2, determining a random polynomial for each input polynomial may comprise determining a single random integer r for both the first input polynomial A[X] and the second input polynomial B[X].

At the third step S3, randomizing the coefficients of each input polynomial may comprise obtaining a randomized first input polynomial A"[X] with coefficients Ai" from said first input polynomial A[X] and a randomized second input polynomial B" [X] with coefficients Bi" from said second input polynomial B[X], such that Ai"=$r_A$*(Ai+q) mod q' and Bi"=$r_B$*(Bi+q) mod q'.

At the fourth step S4, performing the at least one polynomial operation of the cryptographic operation may comprise performing an addition between the randomized first input polynomial A"[X] and the randomized second input polynomial B" [X] to obtain a randomized sum polynomial S"(X) with coefficients Si", such that S"(X)=A"[X]+B" [X].

At the fifth step S5, unmasking the result polynomial Res"(X) may comprise computing sum coefficients Si=1/r× Si" modulo the first integer q to provide a result of the cryptographic operation based on said sum coefficients Si.

By doing so, the result of the polynomial addition can be retrieved in an unmasked form at the fifth step by performing a simple division and a modulo, without removing the multiplicative masking of the input polynomials before performing the multiplication.

In order to speed-up the processing at the fifth step, the values of $1/r_A r_B$ and of 1/r may be precomputed and stored in a memory of the processing means.

According to a second aspect, this invention therefore relates also to a computer program product directly loadable into the memory of at least one computer, comprising software code instructions for performing the steps of the methods according to the first aspect when said product is run on the computer.

According to a third aspect, this invention therefore relates also to a non-transitory computer readable medium storing executable computer code that when executed by a cryptographic device comprising a processing system having at least one hardware processor performs the methods according to the first aspect.

According to a fourth aspect, this invention therefore relates also to a cryptographic device 101 comprising:
- a processing system having at least one hardware processor 201 configured to perform the steps of the methods according to the first aspect,
- at least one memory for storing the input polynomial coefficients and the results of the calculations performed during the different computing steps.

The invention claimed is:

1. A method secured against side channel attacks performing a cryptographic operation of a cryptographic algorithm, said cryptographic operation comprising at least one polynomial operation on at least one input polynomial A[X] in a first polynomial ring $R_q = F_q[X]/(X^n+1)$, with n an integer and q a first integer being a prime number, wherein said method is performed by a cryptographic device comprising a processing system having at least one hardware processor and comprises:

selecting a multiplier integer t and determining a second integer q' by multiplying said first integer q by said selected multiplier integer t (S1), for each input polynomial A[X] with coefficients Ai in $F_q$ with i in [0, . . . ,n−1],
  determining (S2) an invertible random polynomial R[X] in said first polynomial ring $R_q$,
  randomizing (S3) the coefficients Ai of said input polynomial A[X] based on said determined second integer q' and said determined random polynomial R[X] by:
    transforming the input polynomial A[X] into a lifted input polynomial A'[X] with coefficients Ai' by lifting coefficients Ai of said input polynomial A[X] from a representation modulo said first integer q to a representation modulo said second integer q' such that Ai'=Ai+q mod q', with i in [0, . . . ,n−1], the lifted input polynomial A'[X] being a polynomial in a second polynomial ring $R_{q'} = F_{q'}[X]/(X^n+1)$,
    randomizing the lifted input polynomial A'[X] by multiplying it by the random polynomial R[X] modulo said second integer q' to obtain a randomized input polynomial A"[X] in said second polynomial ring $R_{q'}$,
  performing (S4) said at least one polynomial operation of the cryptographic operation on said randomized input polynomials A"[X] instead of said input polynomials A[X] to obtain a result polynomial Res"[X] with coefficients $Res_i$ in $F_{q'}$,
  unmasking (S5) said result polynomial Res"(X) by applying to its coefficients a modulo said first integer q operation and/or by multiplying it by inverses of said random polynomials R[X] determined for the input polynomials to provide a result of the cryptographic operation.

2. The method of claim 1, wherein the cryptographic algorithm is a lattice-based algorithm.

3. The method of claim 1, wherein several second integers q' are precomputed and determining a second integer q' comprises choosing randomly one integer among said precomputed second integer values q'.

4. The method of claim 1, wherein the value of the multiplier integer t is selected such that the value of the second integer q' corresponds to a width of the processor.

5. The method of claim 1, wherein said random polynomial R(X) determined for an input polynomial A[X] has degree zero and is a nonzero random integer $r_A$.

6. The method of claim 5, wherein:
  the polynomial operation comprises a multiplication between a first input polynomial A[X] and a second input polynomial B[X] in the first polynomial ring $R_q$,
  determining a random polynomial for each input polynomial (S2) comprises determining a first random integer $r_A$ for the first input polynomial A[X] and a second random integer rs for the second input polynomial B[X],
  randomizing the coefficients of each input polynomial (S3) comprises obtaining a randomized first input polynomial A"[X] from said first input polynomial A[X] and a randomized second input polynomial B" [X] from said second input polynomial B [X],
  performing the at least one polynomial operation of the cryptographic operation (S4) comprises performing a multiplication between the randomized first input polynomial A"[X] and the randomized second input polynomial B" [X] to obtain a randomized product polynomial P'" [X] with coefficients $P_i'''$, unmasking the result polynomial Res" (X) (S5) comprises computing product coefficients $Pi=1/r_A r_B \times Pi''$ modulo the first integer q to provide a result of the cryptographic operation based on said product coefficients Pi.

7. The method of claim 5, wherein:

the polynomial operation comprises an addition between a first input polynomial A[X] and a second input polynomial B[X] in the first polynomial ring $R_q$, determining a random polynomial for each input polynomial (S2) comprises determining a single random integer r for both the first input polynomial A[X] and the second input polynomial B [X], randomizing the coefficients of each input polynomial (S3) comprises obtaining a randomized first input polynomial A"[X] from said first input polynomial A[X] and a randomized second input polynomial B" [X] from said second input polynomial B [X], performing the at least one polynomial operation of the cryptographic operation (S4) comprises performing an addition between the randomized first input polynomial A"[X] and the randomized second input polynomial B" [X] to obtain a randomized sum polynomial S"(X) with coefficients Si", unmasking the result polynomial Res" (X) (S5) comprises computing sum coefficients Si=1/rx Si" modulo the first integer q to provide a result of the cryptographic operation based on said sum coefficients Si.

8. The method of claim 6, wherein the values of $1/r_A r_B$ and of 1/r are precomputed.

9. The method of claim 1, wherein the cryptographic algorithm is among: a signature generation, encapsulation, decapsulation, public key encryption or decryption, password-based key exchange algorithm.

10. The method of claim 1, is performed by a computer program product directly loadable into a memory of at least one computer, comprising software code instructions for performing the method when said product is run on the computer.

11. The method of claim 10, wherein the memory is a non-transitory computer readable medium storing executable computer code that when executed by a cryptographic device comprising a processing system having at least one hardware processor performs the method.

12. A cryptographic device to secure against side channel attacks performing a cryptographic operation of a cryptographic algorithm, said cryptographic operation comprising at least one polynomial operation on at least one input polynomial A[X] in a first polynomial ring $R_q = F_q[X]/(X^n+1)$, with n an integer and g a first integer being a prime number, said cryptographic device comprising:

a processing system having at least one hardware processor; and at least one memory for storing input polynomial coefficients and the results of the calculations performed during computing steps by said processor below:

selecting a multiplier integer t and determining a second integer q' by multiplying said first integer q by said selected multiplier integer t (S1), for each input polynomial A[X] with coefficients Ai in $F_q$ with i in [0 . . . ,n−1], determining (S2) an invertible random polynomial R[X] in said first polynomial ring $R_q$, randomizing (S3) the coefficients Ai of said input polynomial A[X] based on said determined second integer q' and said determined random polynomial R[X] by:

transforming the input polynomial A[X] into a lifted input polynomial A[X] with coefficients $A_i'$ by lifting coefficients Ai of said input polynomial A[X] from a representation modulo said first integer q to a representation modulo said second integer q' such that Ai'=Ai+g mod q', with i in [0 . . . ,n−1], the lifted input polynomial A'[X] being a polynomial in a second polynomial ring $R_{q'}' = F_{q'}[X]/(X^n+1)$, randomizing the lifted input polynomial A[X] by multiplying it by the random polynomial R[X] modulo said second integer q' to obtain a randomized input polynomial A"[X] in said second polynomial ring $R_{q'}'$, performing (S4) said at least one polynomial operation of the cryptographic operation on said randomized input polynomials A"[X] instead of said input polynomials A[X] to obtain a result polynomial Res"[X] with coefficients $Res_i$ in $F_{q'}$, unmasking (S5) said result polynomial Res"(X) by applying to its coefficients a modulo said first integer q operation and/or by multiplying it by inverses of said random polynomials R[X] determined for the input polynomials to provide a result of the cryptographic operation.

\* \* \* \* \*